United States Patent

Lavigne, Jr. et al.

[15] 3,638,445
[45] Feb. 1, 1972

[54] AIR-COOLED CONDENSER APPARATUS

[72] Inventors: William J. Lavigne, Jr.; Gordon L. Mount, both of Syracuse, N.Y.

[73] Assignee: Carrier Corporation, Syracuse, N.Y.

[22] Filed: Oct. 19, 1970

[21] Appl. No.: 81,973

[52] U.S. Cl..................................62/184, 62/181, 62/182, 165/121
[51] Int. Cl........................................F25b 39/04
[58] Field of Search...............62/181, 182, 183, 184; 165/40

[56] References Cited

UNITED STATES PATENTS 3,366,167   1/1968   Sappes....................................62/183
3,390,539   7/1968   Miner......................................62/184

*Primary Examiner*—William J. Wye
*Attorney*—Harry G. Martin, Jr. and J. Raymond Curtin

[57] ABSTRACT

A pair of fans are employed for circulating a flow of cooling air over a condensing coil. The fans are driven by constant speed reversible electric motors. A number of pressure responsive switches are installed in the coil and are operating successively upon rise and fall of pressure in the coil. The switches actuate motor control relays for selectively operating the motors in forward and reverse direction to vary the volume of airflow over the condensing coil according to the pressure therein.

4 Claims, 3 Drawing Figures

PATENTED FEB 1 1972

3,638,445

INVENTOR.
WILLIAM J. LAVIGNE
GORDON L. MOUNT
BY
*R. Bennett Thompson*
ATTORNEY

AIR-COOLED CONDENSER APPARATUS

BACKGROUND OF THE INVENTION

Different arrangements have been proposed for operating motor driven fans employed in conjunction with air-cooled condensing units. The speed of a variable speed fan motor is varied to provide desired condenser temperature and pressure. In another system a plurality of motor driven fans is employed and the motors are selectively energized and deenergized according to the cooling requirement.

The variable motor speed arrangement is relatively satisfactory in small fan units driven by fractional horsepower motors. However, large motors of several horsepower constructed for variable speed operation are very expensive as well as the speed varying equipment used with the motors. In the arrangement where one motor is operated and the other is deenergized, variation in the airflow is limited to simply a two-step variation in airflow volume. This invention has as an object, an air-cooled condensing apparatus employing a pair of fans driven by constant speed reversible motors. Motor control means is provided for operating the motors individually and collectively in forward and reverse directions for providing one of four different volumes of airflow according to the pressure in the condensing coil.

BRIEF SUMMARY OF THE INVENTION

The two condensing fans are operated by low-cost conventional, three-phase squirrel cage motors. Pressure switches are installed in the condensing coil and are operated in response to the pressure in the coil. These switches are connected to relays for actuation thereof according to the condenser coil pressure. The relays, actuated by the switches, selectively connect the fan motors to the power supply for operation in forward and reverse directions, to vary the volume of airflow over the coil according to the pressure therein.

DESCRIPTION OF THE PREFERRED EMBODIMENT

Figure 1:
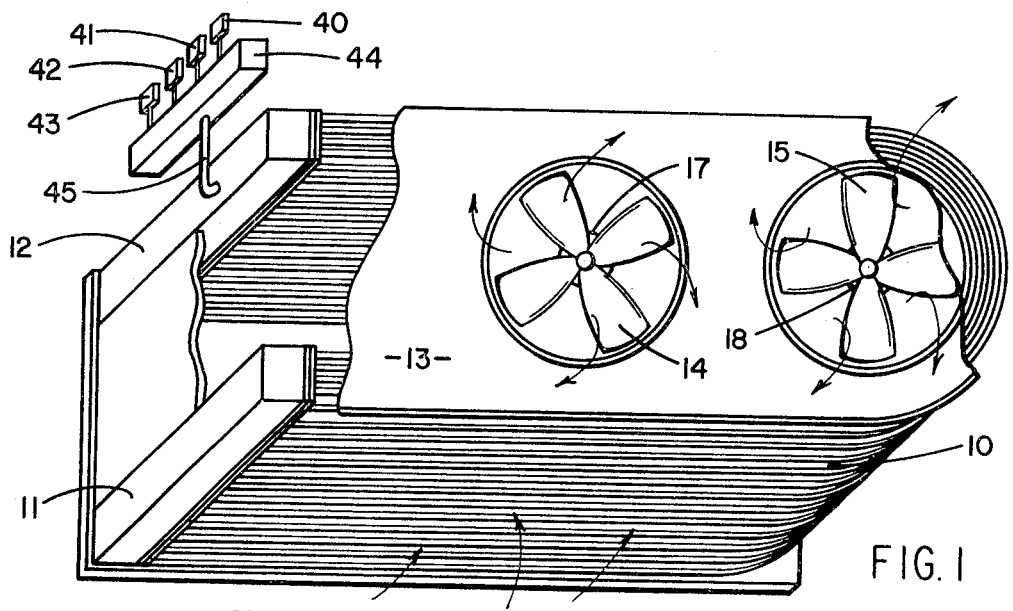
FIG. 1 is a view in perspective illustrating an air-cooled condenser apparatus embodying our invention, with parts broken away.

In the arrangement shown in FIG. 1, the condenser coil consists of a plurality of tubes 10 of U-shaped configuration. The ends of the tubes are attached to vertically disposed headers 11,12. The condensing unit is fabricated with a top member 13 in which fans 14,15 are mounted. The fans are driven by motors 17,18.

Figure 2:
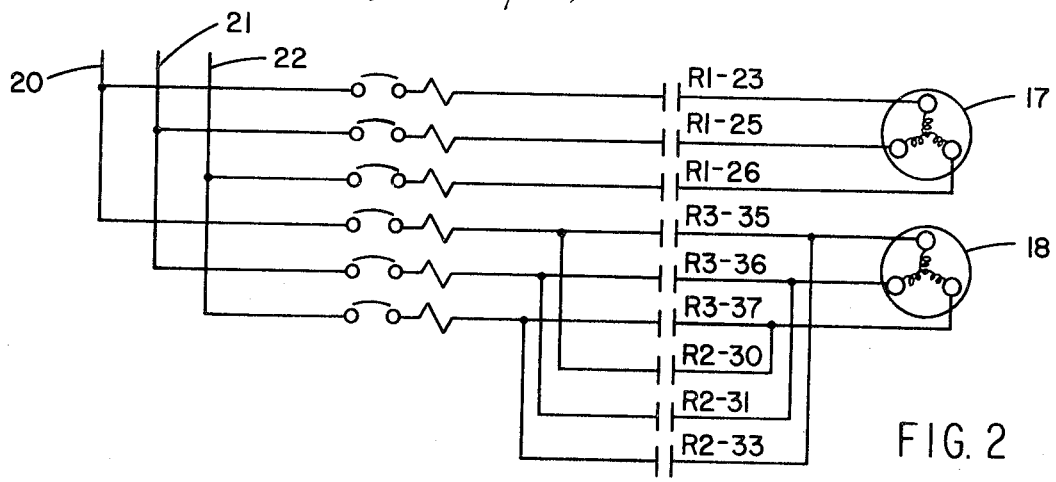
FIG. 2 is a schematic wiring diagram of the relay section of the motor control circuit.

The motors 17,18 are of the three-phase squirrel cage type, powered by a three-phase supply 20,21, and 22, FIG. 2. The motors 17,18 are connected to the power supply 20,21 and 22 in various arrangements depending upon the pressure in the condenser tubes 10.

The motors are connected to the power supply through the contacts of relays R1, R2, and R3. The relay R1 is provided with three contacts R1-23, R1-25 and R1-26. The relay 2 is provided with three contacts R2-30, R2-31 and R2-33. The contacts of relay R3 are designated R3-35, R3-36 and R3-37.

Figure 3:
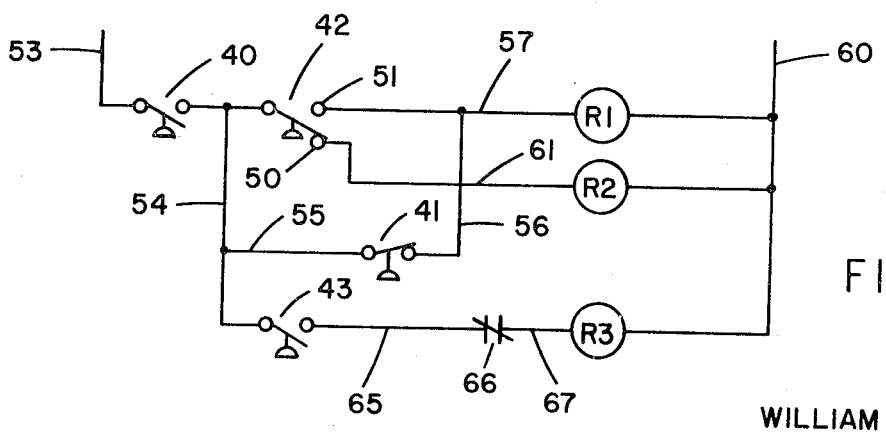
FIG. 3 is a schematic wiring diagram of the pressure switch section of the motor control circuitry.

There are four pressure operated switches connected to the condenser. These switches are designated 40, 41, 42 and 43. They are connected to manifold 44, which in turn is connected to the condenser header 12 by conduit 45. These switches are operated successively with the rise and fall of the pressure in the condenser coil. Referring to FIG. 3, the switches 41,42 and 43 are each connected in series with the switch 40. The switches 40,41 and 43 are of the single pole, single throw type. The switch 42 is of the single pole, double throw type.

The contacts of the switch 40 close when the pressure within the condenser coil reaches the lowermost operating condenser pressure. The movable contact of switch 42 is normally in engagement with the fixed contact 50. The sequence of the operation of the pressure switches 40-43 as the pressure in the condenser coil rises is as follows.

As stated above, the contact of switch 40 closes at the lowermost operating pressure. Upon increase in condenser pressure, the contacts of switch 41 are opened. Upon further increase in condenser pressure, the movable contact of switch 42 is moved out of the engagement with the fixed contact 50 into engagement with the fixed contact 51. Further increase in condenser pressure results in the closure of the contacts of switch 43. It is to be understood that when the condenser pressure is such as to operate any one of the switches 40-43, the switch will remain in operated condition until the condenser pressure drops below the level to which the switch was operated.

Referring now to FIGS. 2 and 3, when the condenser pressure has reached the lowermost operating level, closing the contacts of switch 40, power is supplied to both of relays R1 and R2. The circuit to relay R1 is from the side 53, switch 40, wires 54,55, switch 41, wires 56,57, relay R1 to the side 60. A circuit is also completed from switch 40, contact 50 of switch 42, wire 61, relay R2 to the side 60.

Accordingly, the contacts 23,25 and 26 of relay of R1 are closed providing power from the supply 20,21 and 22, to the motor 17 for operation thereof in the forward direction. The contacts 30,31 and 33 of relay R2 are closed providing a reverse power supply to the motor 18. With this arrangement, at the lowermost condenser pressure, the motor 17 driving fan 14 is operated in forward direction, and the motor 18 operating fan 15 is driving that fan in reverse direction. With this method of operation, the two fans oppose one another producing minimum airflow through the condenser coil.

As the condenser pressure rises, actuating switch 41, the contacts of the switch are opened deenergizing the relay R1, opening the contacts 23, 25, 26 thereof, disconnecting the fan motor 17 from the power supply. However, the power supply to the motor 18 is continued through switches 40,42, continuing the reverse operation of motor 18 and fan 15. This results in an increase in the airflow over the condenser coil to satisfy the increased load on the condenser.

If the condenser pressure still rises, the movable contact of switch 42 is moved into engagement with the contact 51, providing power from the side 53, closed contacts of switch 40, switch 42, through wire 57 to relay R1. This results in the motor 17, driving fan 14, to be again energized in forward direction. However, with the actuation of switch 42, power is no longer supplied from the contact 50 thereof through wire 61 to relay R2, and accordingly, the fan motor 18, which has been operating in reverse direction, is now deenergized. Operation of the fan 14 in forward direction further increases the flow of air over the condenser coil.

If condenser pressure reaches the fourth stage, closing the contacts of switch 43, relay R3 is energized through wire 65, normally close contacts 66 of relay R2, wire 67, to relay R3, to the opposite side 60. In this situation, the contacts 35,36 and 37, of relay R3, are closed effecting the energization of motor 18 in the forward direction. Accordingly, both motors 17,18 are now running in forward direction providing the maximum flow of air over the condenser coil to effect proper cooling thereof. The contacts of the relay R2 simply reverse two phases of the power supply to the three-phase motor 18.

As an example of condensing apparatus operated according to our invention, the two fans in the apparatus were 60 inches in diameter. Each fan was driven by a conventional 15 horsepower three-phase electric motor. In the first condition in which the motor 17 was driven forward, and the motor 18 operated in reverse, the airflow over the condenser coil was 20,000 cfm. With the rise in condenser pressure, causing operation of switch 41, only the motor 18 is operated in reverse, producing an airflow of 29,000 cfm.

In the third stage operation, in which switch 42 is actuated, and the motor 17 driven forwardly, and with no power to the motor 18, the airflow was increased to 48,000 cfm. In the fourth condition, with the highest condenser pressure actuating switch 43, both motors 17,18 are driven forwardly producing an airflow of 110,000 cfm.

We claim:

1. An air-cooled condensing apparatus comprising a condenser coil, two fans operable to create an airflow over said coil in heat exchange relation thereto, a constant speed reversible motor operatively connected to each of said fans for driving the same, and a motor control means responsive to variable pressures in said coil for selectively operating said motors in forward and reverse directions to vary the volume of airflow over said coil according to the pressure therein.

2. Condenser apparatus as set forth in claim 1 wherein said fan motors are electric motors of the three-phase squirrel cage type.

3. Air-cooled condensing apparatus as set forth in claim 1 wherein said motor control means include a plurality of pressure responsive switches connected to said coil, each of said switches being operable in response to a preselected pressure.

4. An air-cooled condensing apparatus comprising a condensing coil, two fans operable to create an airflow over said coil in heat exchange relation thereto, a constant speed electric motor operatively connected to each of said fans for driving the same, a power supply for said motors, a plurality of switches mounted in said coil, each of said switches being operable in response to a predetermined pressure in said coil, relay means connected to said switches and operable, upon actuation thereof, to connect said fan motors to said power supply for operation in forward and reverse directions according to the pressure level in said coil.

* * * * *